United States Patent
Kosic et al.

(10) Patent No.: US 12,400,055 B2
(45) Date of Patent: Aug. 26, 2025

(54) METHODS AND SYSTEMS FOR THE ESTIMATION OF THE COMPUTATIONAL COST OF SIMULATION

(71) Applicant: OnScale, Inc., Redwood City, CA (US)

(72) Inventors: Kyle Kosic, Atlanta, GA (US); Anil Sehgal, Atlanta, GA (US); Scott McClennan, Sunnyvale, CA (US); Joshua Oster-Morris, Atlanta, GA (US); Ryan Diestelhorst, Atlanta, GA (US); David M. Freed, Burlingame, CA (US); Ian Campbell, San Francisco, CA (US)

(73) Assignee: ANSYS, INC., Canonsburg, PA (US)

( * ) Notice: Subject to any disclaimer, the term of this patent is extended or adjusted under 35 U.S.C. 154(b) by 919 days.

(21) Appl. No.: 17/091,505

(22) Filed: Nov. 6, 2020

(65) Prior Publication Data

US 2021/0133378 A1    May 6, 2021

Related U.S. Application Data

(60) Provisional application No. 62/931,299, filed on Nov. 6, 2019.

(51) Int. Cl.
*G06F 30/27* (2020.01)
*G06F 30/23* (2020.01)
*G06N 20/00* (2019.01)

(52) U.S. Cl.
CPC ............ *G06F 30/27* (2020.01); *G06N 20/00* (2019.01); *G06F 30/23* (2020.01)

(58) Field of Classification Search
CPC ...... G06F 30/23; G06F 30/27; G06F 2111/10; G06N 20/00; G06N 3/045; G06N 3/048; G06N 3/08; G06N 5/01
See application file for complete search history.

(56) References Cited

U.S. PATENT DOCUMENTS

| | | | |
|---|---|---|---|
| 8,346,516 B2 | 1/2013 | Misra | |
| 8,744,825 B2 * | 6/2014 | Aquelet | G06F 30/23 703/2 |
| 9,152,740 B1 * | 10/2015 | Brennan | G06F 30/00 |
| 9,430,288 B2 * | 8/2016 | Wilson | G06F 9/5011 |
| 10,187,265 B1 * | 1/2019 | Poort | H04L 47/83 |

(Continued)

FOREIGN PATENT DOCUMENTS

| | | |
|---|---|---|
| WO | 2016/151677 | 9/2016 |
| WO | 2018/031792 | 2/2018 |
| WO | 2019/203822 A1 | 10/2019 |

OTHER PUBLICATIONS

Wu, Q. & Datla, V. "On Performance Modeling and Prediction in Support of Scientific Workflow Optimization" IEEE World Congress Services, pp. 161-168 (2011) (Year: 2011).*

(Continued)

*Primary Examiner* — Jay Hann
(74) *Attorney, Agent, or Firm* — Douglas A. Gastright

(57) ABSTRACT

Estimating the computational cost of simulation using a machine learning model. An example method includes inputting a feature data set into a machine learning model. The feature data set includes model geometry metadata and simulation metadata. The method further includes predicting, using the machine learning model, a computational cost characteristic for a simulation process.

28 Claims, 3 Drawing Sheets

(56) References Cited

U.S. PATENT DOCUMENTS

| | | | |
|---|---|---|---|
| 11,003,816 B2* | 5/2021 | Negishi | G06F 30/23 |
| 2009/0089234 A1 | 4/2009 | Sturrock et al. | |
| 2018/0048532 A1 | 2/2018 | Poort et al. | |
| 2018/0232465 A1* | 8/2018 | Yonekawa | G06F 16/5854 |
| 2018/0247227 A1 | 8/2018 | Holtham | |
| 2019/0065629 A1 | 2/2019 | Phinney et al. | |
| 2020/0050722 A1 | 2/2020 | McClennan et al. | |

OTHER PUBLICATIONS

Nadeem, F., et al. "Modeling and predicting execution time of scientific workflows in the Grid using radial basis function neural network" Cluster Computing, vol. 20, pp. 2805-2819 (2017) (Year: 2017).*

Nadeem, F., et al. "Using Machine Learning Ensemble Methods to Predict Execution Time of e-Science Workflows in Heterogeneous Distributed Systems" IEEE Access, vol. 7, pp. 25138-25149 (Feb. 2019) available from <https://ieeexplore.ieee.org/document/8643927> (Year: 2019).*

Pittino, F., et al. "Prediction of Time-to-Solution in Material Science Simulations Using Deep Learning" Proceedings of Platform for Advanced Scientific Computing Conf. (Jun. 2019) available from <https://dl.acm.org/doi/abs/10.1145/3324989.3325720> (Year: 2019).*

International Search Report and Written Opinion dated Apr. 1, 2021, from International Application No. PCT/US2020/059393, 11 pages.

International Preliminary Report on Patentability and Written Opinion, dated May 10, 2022, received in corresponding International Patent Application No. PCT/US2020/059393.

Cheng et al., Wide & Deep Learning for Recommender Systems, https://doi.org/10.48550/arXiv.1606.07792 (2016), 4 pages.

Extended European Search Report for corresponding EP 20884086.8 mailed Oct. 20, 2023 (8 pages).

Office Action in connection to JP Application No. 2022-526232, dated Sep. 17, 2024.

* cited by examiner

METHODS AND SYSTEMS FOR THE ESTIMATION OF THE COMPUTATIONAL COST OF SIMULATION

CROSS-REFERENCE TO RELATED APPLICATIONS

This application claims the benefit of U.S. provisional patent application No. 62/931,299, filed on Nov. 6, 2019, and titled "Method for the Estimation of the Computational Cost of Simulation," the disclosure of which is expressly incorporated herein by reference in its entirety.

TECHNICAL FIELD

The present disclosure relates to multiphysics simulation tools and focuses specifically on that ability to accurately estimate the computational cost of a simulation prior to execution using machine learning methodologies.

BACKGROUND

Computer-aided engineering (CAE) is the practice of simulating representations of physical objects using computational methods such as finite element method (FEM) and finite difference method (FDM). Modern numerical analysis tools are typically unable to provide feedback to the user on the time it will take for a simulation to complete because an accurate estimate of computational cost for systems of such varied complexity, in some cases with billions of degrees of freedom, can take as long to calculate as the solution itself. There is a need in the pertinent art for a method to rapidly and accurately provide cost feedback prior to the execution of a simulation to allow for new service-based simulation tools to be effectively deployed.

SUMMARY

The present disclosure pertains to methods and systems for estimating the computational cost of a numerical simulation. In one implementation, the method involves the construction of a database containing specific initial settings and resulting performance metrics collected from a large number of simulations that are varied in their form and purpose. From this dataset, a machine learning model is trained and tested such that the trained machine learning model can estimate how many core hours will be required to compute the solution of new simulation based on the same set of settings that were used to train the model. The resulting estimate is used to inform the user of the approximate cost of the simulation prior to execution and providing an opportunity to optimize the model in advance if required.

An example method for estimating the computational cost of simulation is described herein. The method includes inputting a feature data set into a machine learning model. The feature data set includes model geometry metadata and simulation metadata. The method further includes predicting, using the machine learning model, a computational cost characteristic for a simulation process.

Additionally, the model geometry metadata include at least one of a number of elements in a mesh, a number of vertices in the mesh, a surface-to-volume ratio of a model, a minimum element size, a mesh quality metric, an element type and element order, an aspect ratio of the model, a number of edges in the model, a number of surfaces in the model, a number of finite volumes in the model, or a number of control points in the model.

Optionally, the model is a computer-aided design (CAD) model. In some implementations, the method further includes extracting the model geometry metadata from the CAD model.

Alternatively or additionally, the simulation metadata includes an analysis type, a solution domain, a linear solver type, a preconditioner, a time integration method, a spatial integration method, a degree of non-linearity, a non-linear solver option, a type and number of levels of adaptive mesh refinement, a time step size or number of frequencies, a boundary condition degrees-of-freedom, a boundary condition type, a material model type, a material property, a number of cores, or a physics-specific parameter.

Alternatively or additionally, the computational cost characteristic is at least one of a memory usage or a time for the simulation process. Optionally, the computational cost characteristic is a time for a portion of the simulation process. Optionally, the method further includes estimating a number of core hours based, at least in part, on the time for the simulation process.

Alternatively or additionally, the computational cost characteristic is at least one of a time required for meshing, a time required for preprocessing, a time required for solve, a time required for post-processing, or a time required for the simulation process.

Alternatively or additionally, the step of predicting, using the machine learning model, a computational cost characteristic for a simulation process includes a plurality of computational cost characteristics for the simulation process, where each respective computational cost characteristic for the simulation process is based on a different set of compute resources and/or solver options.

Alternatively or additionally, the machine learning model is a deep neural network, a convolutional neural network, gradient boosted decision trees, or Gaussian process regression.

Alternatively or additionally, the feature data set optionally further includes computing environment metadata.

Alternatively or additionally, the method further includes determining the feature data set. In some implementations, the step of determining the feature data set includes performing a plurality of simulations to obtain an initial simulation data set, selecting one or more types of metadata from the initial simulation data set to create a model feature data set, and training and testing the machine learning model using the model feature data set. The one or more types of metadata include model geometry metadata, simulation metadata, computing environment metadata, or combinations thereof. Optionally, the method further includes performing one or more additional simulations, supplementing the model feature data set with metadata from the one or more additional simulations, and training and testing the machine learning model using the supplemented model feature data set. Optionally, the step of steps of training and testing the machine learning model are performed iteratively.

Optionally, in some implementations, the step of inputting the feature data set into a machine learning model includes inputting the model geometry metadata into a first machine learning model and inputting the simulation metadata into a second machine learning model. In these implementations, the method optionally further includes creating a fixed-dimensional representation vector from respective outputs of the first and second machine learning models; and analyzing the fixed-dimensional representation vector to predict the computational cost characteristic for the simulation process. Optionally, the step of analyzing the fixed-dimensional representation vector to predict the computational cost characteristic for the simulation process includes performing a regression analysis.

An example system for estimating the computational cost of simulation is also described herein. The system includes a machine learning model, and a computing device including a processor and a memory. The memory has computer-executable instructions stored thereon that, when executed by the processor, cause the processor to input a feature data set into the machine learning model, and predict, using the machine learning model, a computational cost characteristic for a simulation process. The feature data set includes model geometry metadata and simulation metadata.

An example method for estimating the computational cost of finite element analysis (FEA) simulation is also described herein. The method includes receiving a first data set including a computer-aided design (CAD) model; inputting the first data set into a first machine learning model; and extracting a model geometry data set by using the first machine learning model to process the first data set. The method also includes receiving a second data set including metadata associated with the CAD model; inputting the second data set into a second machine learning model; and extracting a simulation metadata set by using the second machine learning model to process the second data set. The method further includes creating a fixed-dimensional representation vector from the model geometry and simulation metadata sets; and analyzing the fixed-dimensional representation vector to determine a target parameter for an FEA simulation.

Additionally, the step of analyzing the fixed-dimensional representation vector optionally includes inputting the fixed-dimensional representation vector into a head network; and extracting the target parameter for the FEA simulation by using the head network to process the fixed-dimensional representation vector. Alternatively or additionally, the head network is configured to perform a regression to determine the target parameter for FEA simulation.

Alternatively or additionally, the target parameter is at least one of a memory usage or a simulation run time for the FEA simulation. In some implementations, the method further includes estimating a number of core hours based, at least in part, on the simulation run time.

Alternatively or additionally, the metadata associated with the CAD model includes at least one of a time iteration, a material property, a number of cores, a physics-specific parameter, or a number of elements in a mesh of the CAD model.

Alternatively or additionally, the metadata associated with the CAD model is discretized or continuous.

Alternatively or additionally, the first machine learning model is a convolutional neural network.

Alternatively or additionally, the second machine learning model is a combination of neural oblivious decision trees and fully-connected neural networks.

Alternatively or additionally, the CAD model includes a spatial model geometry. Optionally, the spatial model geometry is divided into a plurality of discrete cells. Optionally, the method further includes extracting the spatial model geometry as a point cloud, where the step of inputting the first data set into a first machine learning model includes inputting the point cloud into the first machine learning model. Additionally, the point cloud includes respective vertices of the discrete cells. Alternatively or additionally, the point cloud includes at least an interpolated physical value, a resampled physical value, or a boundary condition.

Another example method for estimating the computational cost of FEA simulation is described herein. The method includes receiving a data set including a computer-aided design (CAD) model and metadata; inputting the data set into a machine learning model; and extracting a model geometry and simulation metadata set by using the machine learning model to process the data set. The method also includes creating a fixed-dimensional representation vector from the feature set; and analyzing the fixed-dimensional representation vector to determine a target parameter for an FEA simulation.

It should be understood that the above-described subject matter may also be implemented as a computer-controlled apparatus, a computer process, a computing system, or an article of manufacture, such as a computer-readable storage medium. Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE FIGURES

The components in the drawings are not necessarily to scale relative to each other. Like reference numerals designate corresponding parts throughout the several views. These and other features of will become more apparent in the detailed description in which reference is made to the appended drawings wherein.

DETAILED DESCRIPTION

Figure 1:
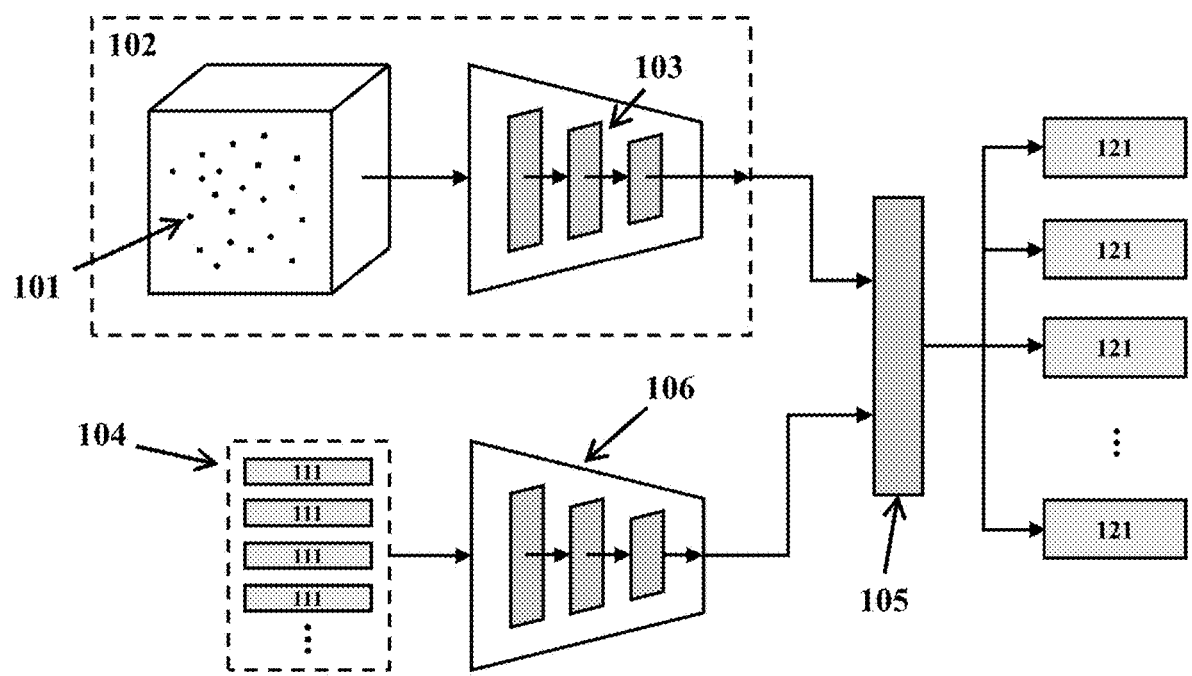
FIG. 1 is a block diagram of a machine learning estimation process using separate neural networks for the simulation model data and the simulation metadata according to implementations described herein.

The present disclosure can be understood more readily by reference to the following detailed description, examples, drawings, and their previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching. To this end, those skilled in the relevant art will recognize and appreciate that many changes can be made, while still obtaining beneficial results. It will also be apparent that some of the desired benefits can be obtained by selecting some of the features without utilizing other features. Accordingly, those who work in the art will recognize that many modifications and adaptations may be possible and can even be desirable in certain circumstances and are contemplated by this disclosure. Thus, the following description is provided as illustrative of the principles and not in limitation thereof.

As used throughout, the singular forms "a," "an" and "the" include plural referents unless the context clearly dictates otherwise. Thus, for example, reference to "a 3D model" can include two or more such 3D models unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The present disclosure relates to methods and systems for the estimation of the computational cost of simulations (e.g., finite element analysis (FEA) simulations) using machine learning techniques. The computational cost estimates described herein are performed before a desired simulation begins, i.e., based on a priori knowledge of the desired simulation. By providing a prediction before the desired simulation is commenced, an interested party (e.g., user, customer, etc.) is provided with an understanding of the desired simulation's cost (e.g., time, computing resources, monetary cost, etc.). Such information allows the interested party to make decisions, including but not limited to, whether to proceed with the desired simulation, how to proceed with the desired simulation, and/or with what computing resources. It should be understood that there is a need for such information in the art; however, such information is not provided by conventional systems and methods, particularly using machine learning methods. For example, machine learning techniques are used to estimate cost in the form of memory and core hours, where a core hour is the amount of computation that can be performed by a single computing core in one hour. In some implementations, the machine learning techniques described herein are used to predict a plurality of computational cost characteristics for the simulation process, where each respective computational cost characteristic for the simulation process is based on a different set of compute resources and/or solver options. It should be understood that this provides the interested party with additional information and options, and optionally, such information can then be used to select the optimal set of computing resources (e.g., memory, number of cores, etc.) required to complete the simulation given the interested party's resources and circumstances. It should be understood that a computer processor may comprise multiple computing cores. The use of machine learning techniques can greatly improve the efficiency and accuracy of estimation, particularly in a time-domain analysis, where in the current state of the art initial time-steps must be solved and then extrapolated, leaving significant room for error when time to convergence is unknown. Machine learning is well-suited for problems of this type due to the vast complexity of the potential inputs to the simulation.

Referring now to FIG. 1, a block diagram of a machine learning estimation process using separate neural networks for the simulation model data and the simulation metadata is shown. It is contemplated that the function of the machine learning estimator is to perform a regression on the amount of memory and total run time a simulation will incur. From the runtime and the number of computing cores utilized, a measure of the core-hour cost of the simulation can be calculated by the machine learning estimator. In other words, the machine learning estimator can output the core-hour cost measure. The two primary sources of input into the estimator are computer-aided design (CAD) geometry and simulation metadata. Optionally, other sources of input into the estimator can include, but are not limited to, metadata pertaining to supporting operations such as post-processing of data and metrics of the compute hardware. The CAD geometry is divided into discrete elements called a mesh, which aid in the construction of the finite element equations used to compute a solution to the problem. The metadata can include, but are not limited to:

Time iterations (for dynamic solves)
Material properties
Cores being used
Physics-specific parameters (solution equations, load types, boundary condition types)
Number of elements per physics
Total number of elements in the mesh
Analysis type (e.g. static, quasistatic, dynamic)
Solution domain (e.g. time or frequency)
Linear solver type (e.g. direct or iterative methods)
Matrix preconditioner type
Degree of non-linearity
Non-linear solver options
Level of adaptive mesh refinement It should be understood that the specific metadata outlined above is provided only as an example. This disclosure contemplates that other simulation metadata may be used with the machine learning models described herein. The target parameters to be considered as inputs to the model and estimated for new simulations are:

Memory use
Simulation run time

It should be understood that the specific target parameters outlined above are provided only as an example. This disclosure contemplates that other target parameters may be used with the machine learning models described herein.

In one implementation of the method, the estimation is achieved using a strategy that divides the simulation into two sets of data that will be processed separately by different neural networks. The first set of data is related to the spatial model geometry (e.g., the CAD model). The spatial model geometry is contained in a CAD file such as a STEP file. The STEP file format is known in the art. This disclosure contemplates that the spatial model geometry may be contained in other types of CAD files. It is contemplated that the geometry in question can be divided into cells during the meshing phase of simulation preprocessing using algorithms, for example such as those described in U.S. Patent Application Pub. No. 2020/0050722, filed Aug. 9, 2019, and titled "HYBRID MESHING METHOD FOR FINITE ELEMENT ANALYSIS." The vertices of these cells can be directly exported as a point cloud 101, retaining any interpolated or resampled physical values and boundary conditions from the simulation setup. Resolution adjustments will also be made during resampling to ensure compatibility with the network architecture, ensuring that any changes to geometry are retained as metadata in the point cloud 101. Additionally, statistics relevant to estimator results (such as model extents, number of cells, etc.) can be retained as external metadata and used as independent inputs to the final model outside the convolutional network.

A first machine learning model is created and pretrained to process the point cloud 101. For example, it is contemplated that a convolutional neural network 102 is created and pre-trained on a 3D data benchmark such as Princeton's ModelNet40 (modelnet.cs.princeton.edu) or Stanford's ShapeNet (shapenet.cs.stanford.edu/). The convolutional neural network 102 includes the point cloud 101 processing component and modular components 103. The convolutional neural network design (or "architecture") is defined by the modular components 103 which sequence together to process input 3D point clouds (e.g., point cloud 101) and produce a fixed-length vector 105 representation. Modular components 103 used here include but are not necessarily limited to convolution filters ("convolution" layers), affine transformations ("dense" layers), adaptive normalization and scaling transformations, pooling, and various non-linear functions. It should be understood that a convolutional neural network is provided only as an example first machine learning model. This disclosure contemplates that other machine learning models, including gradient boosted decision trees and Gaussian process regression, may be trained and used with the systems and methods described herein.

The neural network comprises a standardized model architecture which has empirically demonstrated strength at the benchmark's classification and semantic segmentation tasks and training to near state-of-the-art error metrics ("pre-training"). Methods for achieving low error rate on existing tasks are widely known and published via open-source and open-license channels. Once the standardized model is selected, the neural network is then fine-tuned on proprietary simulation data in order to regress the desired variables. The process of fine-tuning involves removing the final classification and semantic segmentation weight layer of the trained network and creating a new set of weight layers 121 (or "head network 121"), which is designed to output values in the desired functional codomain.

With the earlier layers of the neural network 102 sourced from ModelNet40 or ShapeNet retaining the pre-trained priors useful in recognizing patterns in 3D geometries, the learning rate can be reduced, and training resumed against the desired target variable ("fine-tuning"). The neural network architecture emphasizes a hierarchical representation of local model topologies, which strongly correlate to simulation run-time under a variety of different physics analyses. The point cloud 101 is processed by the trained neural network 102 to create a fixed-dimensional vector representation 105 of the geometry.

The second set of data to be processed comprises metadata 111 gleaned from the geometric model and simulation metadata generated from parsed parameters recorded from the configuration of the simulation run. Some features are dependent on simulation physics type, such as static analysis versus transient analysis. Examples of these features would include things such as mesh resolution, material properties, CPU cores being used, or mesh elements for each physics being solved. These features are discretized as categorical variables or as continuous floating-point values. The metadata 111 is then processed by a second machine learning model. For example, a combination of neural oblivious decision trees and fully-connected neural networks 106 can be used to process the metadata 111. A conventional wide-deep (arxiv.org/abs/1606.07792) model can create the fixed-dimensional embedding of these features. It should be understood that a combination of neural oblivious decision trees and fully connected neural networks is provided only as an example second machine learning model. This disclosure contemplates that other machine learning models may be trained and used with the systems and methods described herein.

Lastly, it is contemplated that the resulting fixed dimensional vector representation 105 from the combination of these two neural networks (geometry and metadata) is then attached to head networks 121 that are each responsible for a specific regression target, generally either total memory usage or total runtime. The head networks 121 can also include statistical estimations such as error bars related to each metric. The resulting output is an estimation of the total memory usage or total runtime based on training data collected from other simulations run on the same platform from which geometry vector representations and metadata can be collected.

Figure 2:
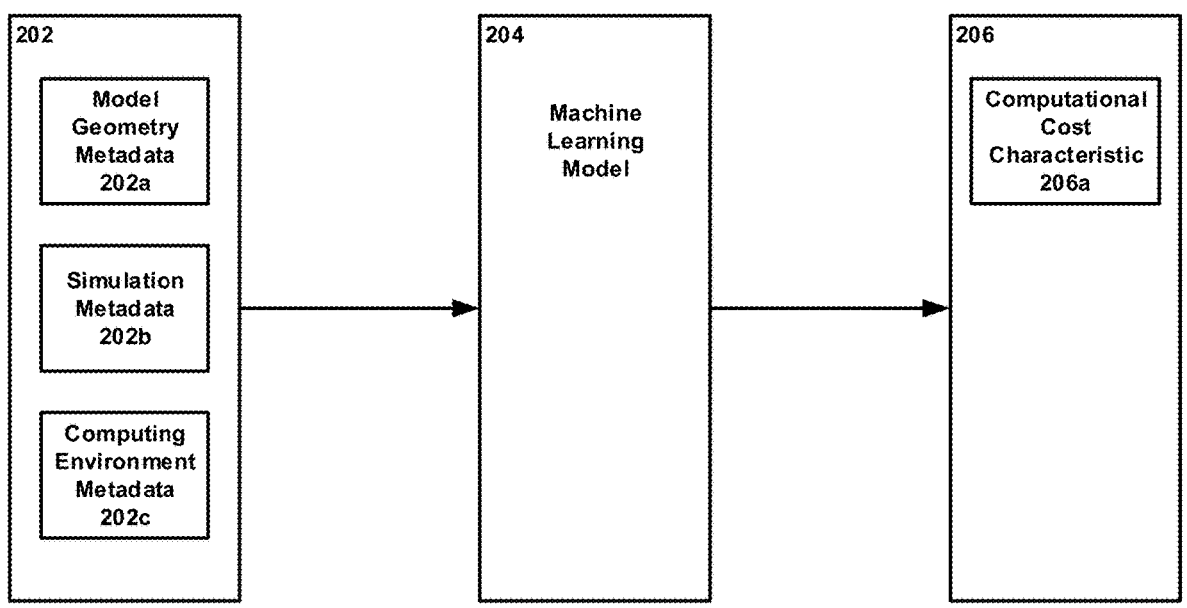
FIG. 2 is a block diagram of another machine learning estimation process according to implementations described herein.

Referring now to FIG. 2, an example method for estimating the computational cost of a simulation process is shown. As used herein, the simulation process includes a simulation (e.g., FEA simulation) and optionally upload/download of files, meshing of model geometry, preprocessing of simulation data and/or postprocessing of simulation results. An example feature data set is shown in block 202. As described below, the feature data set becomes the input to a machine learning model 204. The feature data set is therefore the data which is analyzed by a trained machine learning model operating in inference mode to make a prediction (also referred to as "target" or "targets" of the machine learning model). This disclosure contemplates that the feature data set can be stored by a computing device (e.g., computing device 300 shown in FIG. 3). In some implementations, the feature data set is maintained by the computing device or in a cloud storage environment. Alternatively or additionally, in some implementations, the feature data set is accessed by the computing device, for example, over a network.

Alternatively or additionally, in some implementations, the feature data set is optionally determined from a larger data set, e.g., a model feature data set that can include training data, validation data, and/or testing data. As discussed herein, the feature data set determination can be performed using an automated system and method. For example, an automated process can be implemented to determine the feature data set (i.e., which specific metadata) upon which the machine learning model 204 makes predictions. This process can, for example, include identifying a representative sample of simulations, selecting a wide array of possible features (e.g., model geometry metadata, simulation metadata, computing environment metadata, etc.), running the simulations to extract the feature values and using data science methods to determine which features are important. The model feature data set, which is used for training and testing and optionally validation, is created with the important features. Thereafter, a large set of data points (simulations) can be collected, the features for those simulations can be extracted, and the data can be analyzed to ensure adequate coverage before iteratively training and adding data to reach a desired confidence level. This allows creation of an initial machine learning model. This disclosure contemplates that an automatic system and method for continuously collecting data from cloud-based simulations and updating the model feature data set can be implemented to retrain and update the initial machine learning model. The automatic system and method can generate the machine leaning model 204. It should be understood that the machine learning model 204 can be updated to improve accuracy with new data points and to handle newly developed simulation capabilities.

It is also contemplated that the model feature data set can optionally be frequently updated and the machine learning model retrained to account for newly developed simulation capabilities and changes to the computing environment. As described herein, this can be accomplished using an automated system and method. For example, in a cloud-computing environment, the feature set is continuously updated by collecting anonymous CAD and simulation metadata generated by simulations run on the system, without collecting the actual, possibly proprietary, CAD or simulation files. Metadata from each simulation run on the system is recorded and added to the database. The machine learning model is frequently retrained, making use of the growing model feature data set to improve prediction accuracy and enable prediction based on new features. Furthermore, as the simulation software is updated and upgraded, the simulation time and memory may be affected. The version number of various components of the software, including third party software is stored and included as part of the input feature set. The estimations will evolve as the software evolves.

The feature data set includes at least two types of data, e.g., model geometry metadata 202a and simulation metadata 202b. Optionally, the feature data set further includes computing environment metadata 202c. It should be understood that the feature data set is not limited to model geometry, simulation, and computing environment metadata and may include other features. The model geometry metadata 202a can include a number of elements in a mesh, a number of vertices in the mesh, a surface-to-volume ratio of a model, a minimum element size, a mesh quality metric, an element type and element order, an aspect ratio of the model, a number of edges in the model, a number of surfaces in the model, a number of finite volumes in the model, or a number of control points in the model. As noted above, the model geometry metadata 202a may include metadata related to the geometry, the mesh, or both. It should be understood that the model geometry metadata examples provided above are only provided as example model geometry metadata 202a. This disclosure contemplates using other types of model geometry metadata with the techniques described herein. Optionally, the model is a computer-aided design (CAD) model, for example, a model stored in STEP format. It should be understood that STEP files are only provided as an example CAD file type. This disclosure contemplates that other file types may be used. In some implementations, the model geometry metadata is extracted from the CAD model. Metadata can be extracted from the geometry using techniques including, but not limited to, geometric feature detection to analyze the NURBS (Non-Uniform Rational B-Spline) curves and surfaces comprising the geometry or, in some cases, discrete geometry composed of points, edges, facets and volumes to obtain metrics including smallest feature size, shortest edge length, number of parts, number of faces and volume of the model. Metadata can also be extracted from the meshed model through analysis of the mesh to obtain metrics including number of vertices, number of elements, histograms of element size and minimum and average element quality. Techniques for extracting metadata from the geometry and/or mesh are known in the art and are therefore not described in further detail herein.

As noted above, the feature data set also includes simulation metadata 202b. The simulation metadata can include an analysis type, a solution domain, a linear solver type, a preconditioner, a time integration method, a spatial integration method, a degree of non-linearity, a non-linear solver option, a type and number of levels of adaptive mesh refinement, a time step size or number of frequencies, a boundary condition degrees-of-freedom, a boundary condition type, a material model type, a material property, a number of cores, and/or a physics-specific parameter. It should be understood that the simulation metadata examples above are only provided as example simulation metadata 202b. This disclosure contemplates using other types of simulation metadata with the techniques described herein.

As noted above, the feature data set optionally further includes computing environment metadata 202c. The computing environment metadata can include hardware information, number of processors, and/or bandwidth. It should be understood that the computing environment metadata examples above are only provided as example computing environment metadata 202c. This disclosure contemplates using other types of computing environment metadata with the techniques described herein.

As described above, the feature data set (e.g., model geometry metadata 202a and simulation metadata 202b and optionally computing environment metadata 202c) is input into the machine learning model 204. The machine learning model 204 can be a deep neural network, a convolutional neural network, gradient boosted decision trees or Gaussian process regression. It should be understood that the machine learning model examples above are only provided as examples. This disclosure contemplates using other types of machine learning models with the techniques described herein. This disclosure contemplates that the machine learning model 204 can be selected, trained, and tested with a large training data set containing model geometry and simulation metadata using training methods known in the art. Once trained, the machine learning model 204 can be used in inference mode to make predictions based on new feature data sets.

For example, in some implementations, the machine learning model 204 is a neural network. An artificial neural network (ANN) is a computing system including a plurality of interconnected neurons (e.g., also referred to as "nodes"). This disclosure contemplates that the nodes can be implemented using a computing device (e.g., a processing unit and memory as described herein). The nodes can optionally be arranged in a plurality of layers such as input layer, output layer, and one or more hidden layers. Each node is connected to one or more other nodes in the ANN. For example, each layer is made of a plurality of nodes, where each node is connected to all nodes in the previous layer. The nodes in a given layer are not interconnected with one another, i.e., the nodes in a given layer function independently of one another. As used herein, nodes in the input layer receive data from outside of the ANN, nodes in the hidden layer(s) modify the data between the input and output layers, and nodes in the output layer provide the results. Each node is configured to receive an input, implement n activation function (e.g., binary step, linear, sigmoid, tan H, or rectified linear unit (ReLU) function), and provide an output in accordance with the activation function. Additionally, each node is associated with a respective weight. ANNs are trained with a data set to minimize the cost function, which is a measure of the ANN's performance. Training algorithms include, but are not limited to, backpropagation. The training algorithm tunes the node weights and/or bias to minimize the cost function. It should be understood that any algorithm that finds the minimum of the cost function can be used to for training the ANN.

It should be understood that a neural network is provided only as an example machine learning model. This disclosure contemplates that the machine learning model can be any supervised learning model, semi-supervised learning model, or unsupervised learning model. Optionally, the machine learning model is a deep learning model, for example, a convolutional neural network (CNN). A CNN is a type of deep neural network that has been applied, for example, to image analysis applications. Unlike a traditional neural networks, each layer in a CNN has a plurality of nodes arranged in three dimensions (width, height, depth). CNNs can include different types of layers, e.g., convolutional, pooling, and fully-connected (also referred to herein as "dense") layers. A convolutional layer includes a set of filters and performs the bulk of the computations. A pooling layer is optionally inserted between convolutional layers to reduce the computational power and/or control overfitting (e.g., by downsampling). A fully-connected layer includes neurons, where each neuron is connected to all of the neurons in the previous layer. The layers are stacked similar to traditional neural networks. Machine learning models are known in the art and are therefore not described in further detail herein.

At block 206, a computational cost characteristic 206a for a simulation process is predicted using the machine learning model 204. In other words, the computational cost characteristic 206a is the target of the machine learning model 204. The machine learning model 204 predicts the computational cost characteristic 206a before the simulation process begins, i.e., based on a priori knowledge of the simulation process. In some implementations, the computational cost characteristic 206a is a memory usage and/or a time for the simulation process. Optionally, a number of core hours is estimated based, at least in part, on the time for the simulation process. Alternatively or additionally, the computational cost characteristic 206a is a time required for meshing, a time required for preprocessing, a time required for solve, a time required for post-processing, and/or a time required for the simulation process. In some implementations, the computational cost characteristic 206a is a time for the entire simulation process, while in other implementations, the computational cost characteristic 206a is a time for a portion of the simulation process. For example, the simulation process may include preprocessing, meshing, simulation, and post-processing steps. It should be understood that preprocessing, meshing, simulation, and post-processing steps are provided only as example portions or steps of the simulation process. This disclosure contemplates that the simulation process can include other portions or steps. Accordingly, the computational cost characteristic 206a estimated by the machine learning model 204 may be the time required for preprocessing operations, time required for meshing operations, simulation run time, time required for post-processing operations, or sum of times for two or more steps of the simulation process. It should be understood that characteristic above are provided only as example computational cost characteristics 206a. This disclosure contemplates predicting other types of computational cost characteristics with the techniques described herein.

Optionally, in some implementations, the machine learning model 204 predicts a plurality of computational cost characteristics for the simulation process, where each respective computational cost characteristic for the simulation process is based on a different set of compute resources and/or solver options. It should be understood that computational costs characteristics are expected to vary depending on the computing resources and/or solver options. The plurality of computational cost characteristics predicted by the machine learning model 204 can optionally be transmitted to and/or displayed by an interested party (e.g., user, customer, etc.). It should also be understood that providing multiple predictions provides the interested party with useful information, for example, information used to inform decision making. For example, the predictions at block 206 may show that increasing the number of processors initially has increasing benefit but then the benefit begins to reach a plateau (e.g., benefit curve is asymptotic). In this example, the interested party may select computing resources that provide a desired benefit for the application.

Optionally, in some implementations, the step of inputting the feature data set into a machine learning model includes inputting the model geometry metadata into a first machine learning model (e.g., CNN 102 shown in FIG. 1) and inputting the simulation metadata into a second machine learning model (e.g., neural oblivious decision trees and fully-connected neural networks 106 shown in FIG. 1). In these implementations, a fixed-dimensional representation vector (e.g., vector 105 shown in FIG. 1) is created from respective outputs of the first and second machine learning models, and the fixed-dimensional representation vector is then analyzed to predict the computational cost characteristic for the simulation. Optionally, the step of analyzing the fixed-dimensional representation vector to predict the computational cost characteristic for the simulation includes performing a regression analysis.

It should be appreciated that the logical operations described herein with respect to the various figures may be implemented (1) as a sequence of computer implemented acts or program modules (i.e., software) running on a computing device (e.g., the computing device described FIG. 3), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 3:
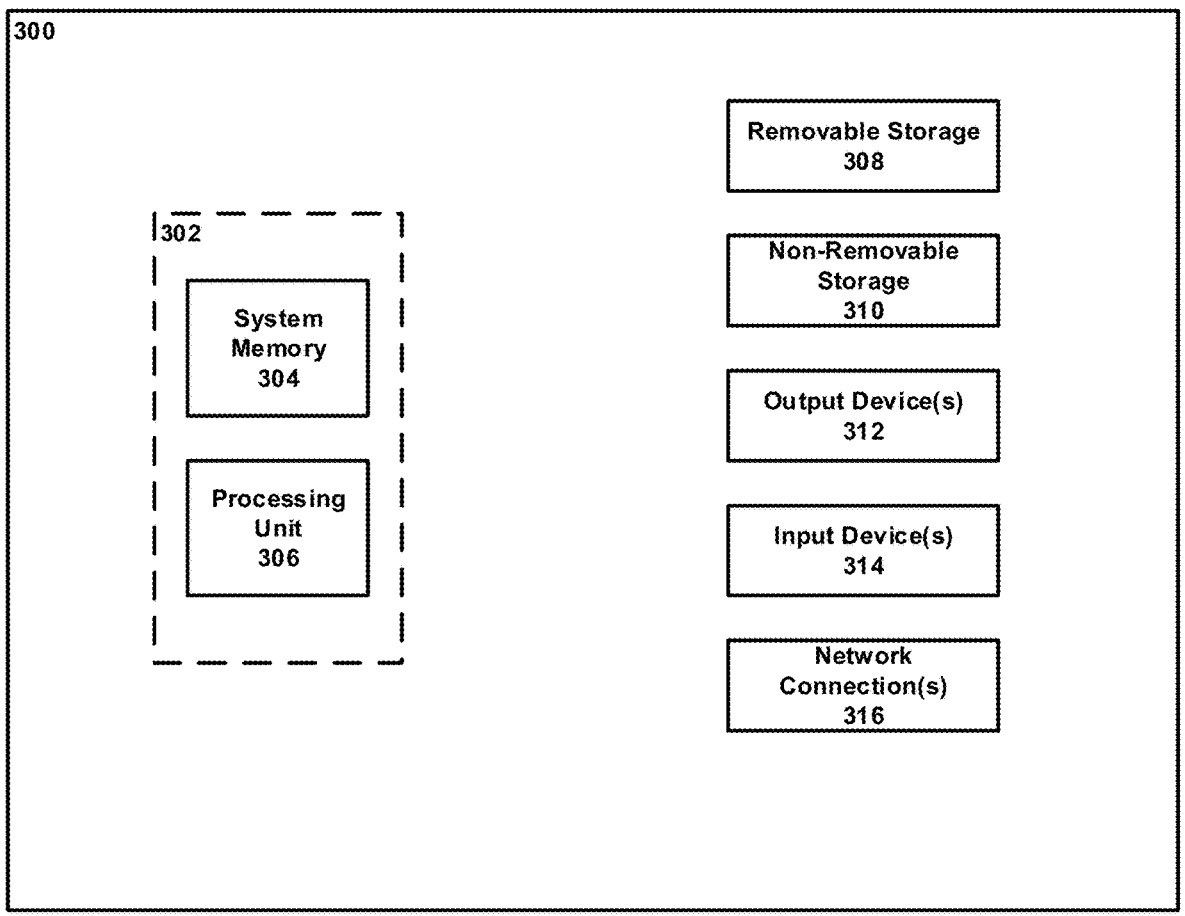
FIG. 3 is an example computing device.

Referring to FIG. 3, an example computing device 300 upon which the methods described herein may be implemented is illustrated. It should be understood that the example computing device 300 is only one example of a suitable computing environment upon which the methods described herein may be implemented. Optionally, the computing device 300 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 300 typically includes at least one processing unit 306 and system memory 304. Depending on the exact configuration and type of computing device, system memory 304 may be volatile (such as random access memory (RAM)), non-volatile (such as read-only memory (ROM), flash memory, etc.), or some combination of the two. This most basic configuration is illustrated in FIG. 3 by dashed line 302. The processing unit 306 may be a standard programmable processor that performs arithmetic and logic operations necessary for operation of the computing device 300. The computing device 300 may also include a bus or other communication mechanism for communicating information among various components of the computing device 300.

Computing device 300 may have additional features/functionality. For example, computing device 300 may include additional storage such as removable storage 308 and non-removable storage 310 including, but not limited to, magnetic or optical disks or tapes. Computing device 300 may also contain network connection(s) 316 that allow the device to communicate with other devices. Computing device 300 may also have input device(s) 314 such as a keyboard, mouse, touch screen, etc. Output device(s) 312 such as a display, speakers, printer, etc. may also be included. The additional devices may be connected to the bus in order to facilitate communication of data among the components of the computing device 300. All these devices are well known in the art and need not be discussed at length here.

The processing unit 306 may be configured to execute program code encoded in tangible, computer-readable media. Tangible, computer-readable media refers to any media that is capable of providing data that causes the computing device 300 (i.e., a machine) to operate in a particular fashion. Various computer-readable media may be utilized to provide instructions to the processing unit 306 for execution. Example tangible, computer-readable media may include, but is not limited to, volatile media, non-volatile media, removable media and non-removable media implemented in any method or technology for storage of information such as computer readable instructions, data structures, program modules or other data. System memory 304, removable storage 308, and non-removable storage 310 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 306 may execute program code stored in the system memory 304. For example, the bus may carry data to the system memory 304, from which the processing unit 306 receives and executes instructions. The data received by the system memory 304 may optionally be stored on the removable storage 308 or the non-removable storage 310 before or after execution by the processing unit 306.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for estimating the computational cost of simulation, comprising:
   performing a plurality of simulations to obtain an initial simulation data set;
   selecting one or more types of metadata from the initial simulation data set to create a model feature data set, the model feature data set comprising model geometry metadata and simulation metadata wherein:
      the model geometry metadata is selected from a group consisting of a number of elements in a mesh, a number of vertices in the mesh, a surface-to-volume ratio of a model, a minimum element size, a mesh quality metric, an element type and element order, an aspect ratio of the model, a number of edges in the model, a number of surfaces in the model, a number of finite volumes in the model, and a number of control points in the model,
      the simulation metadata is selected from a group consisting of an analysis type comprising (i) a static analysis, (ii) a quasistatic analysis, or (iii) a dynamic analysis, a solution domain, a linear solver type, a preconditioner, a time integration method, a spatial integration method, a degree of non-linearity, a non-linear solver option, a type and number of levels of adaptive mesh refinement, a time step size or number of frequencies, a boundary condition degrees-of-freedom, a boundary condition type, a material model type, a material property, a number of cores, and a physics-specific parameter, and
   training and testing a machine learning model using the model feature data set;
   inputting a feature data set into the machine learning model, the feature data set comprising the model geometry metadata and the simulation metadata, wherein inputting the feature data set into the machine learning model comprises (i) inputting the model geometry metadata into a first machine learning model and (ii) inputting the simulation metadata into a second machine learning model; and
   predicting, using the machine learning model, a computational cost characteristic for a simulation process, wherein the computational cost characteristic is selected from a group consisting of a memory usage, a time for the simulation process, a time for meshing, a time for preprocessing, a time for solve, and a time for post-processing, and wherein the simulation process is a computer-aided engineering process for simulating a physical human-made object or human-made system represented by computer-aided design.

2. The computer-implemented method of claim 1, wherein the computational cost characteristic is predicted before performing the simulation process.

3. The computer-implemented method of claim 1, wherein the model is a computer-aided design (CAD) model.

4. The computer-implemented method of claim 3, further comprising extracting the model geometry metadata from the CAD model.

5. The computer-implemented method of claim 1, wherein the computational cost characteristic is at least one of the memory usage or the time for the simulation process.

6. The computer-implemented method of claim 5, wherein the computational cost characteristic is a time for a portion of the simulation process.

7. The computer-implemented method of claim 5, further comprising estimating a number of core hours based, at least in part, on the time for the simulation process.

8. The computer-implemented method of claim 1, wherein predicting, using the machine learning model, a computational cost characteristic for a simulation process comprises a plurality of computational cost characteristics for the simulation process, each respective computational cost characteristic for the simulation process being based on a different set of compute resources and/or solver options.

9. The computer-implemented method of claim 1, wherein the machine learning model is a deep neural network, a convolutional neural network, gradient boosted decision trees, or Gaussian process regression.

10. The computer-implemented method of claim 1, wherein the feature data set further comprises computing environment metadata, wherein the computing environment metadata is selected from a group consisting of hardware information, a number of processors, and a bandwidth.

11. The computer-implemented method of claim 1, further comprising determining the feature data set.

12. The computer-implemented method of claim 1, further comprising:
performing one or more additional simulations;
supplementing the model feature data set with metadata from the one or more additional simulations; and
training and testing the machine learning model using the supplemented model feature data set.

13. The computer-implemented method of claim 1, wherein the steps of training and testing the machine learning model are performed iteratively.

14. The computer-implemented method of claim 1 further comprising:
creating a fixed-dimensional representation vector from respective outputs of the first and second machine learning models; and
analyzing the fixed-dimensional representation vector to predict the computational cost characteristic for the simulation process.

15. A system for estimating the computational cost of simulation, comprising:
a computing device comprising a processor and a memory, the memory having computer-executable instructions stored thereon that, when executed by the processor, cause the processor to:
perform a plurality of simulations to obtain an initial simulation data set;
select one or more types of metadata from the initial simulation data set to create a model feature data set, the model feature data set comprising model geometry metadata and simulation metadata, wherein:
the model geometry metadata is selected from a group consisting of a number of elements in a mesh, a number of vertices in the mesh, a surface-to-volume ratio of a model, a minimum element size, a mesh quality metric, an element type and element order, an aspect ratio of the model, a number of edges in the model, a number of surfaces in the model, a number of finite volumes in the model, and a number of control points in the model,
the simulation metadata is selected from a group consisting of an analysis type comprising (i) a static analysis, (ii) a quasistatic analysis, or (iii) a dynamic analysis, a solution domain, a linear solver type, a preconditioner, a time integration method, a spatial integration method, a degree of non-linearity, a non-linear solver option, a type and number of levels of adaptive mesh refinement, a time step size or number of frequencies, a boundary condition degrees-of-freedom, a boundary condition type, a material model type, a material property, a number of cores, and a physics-specific parameter, and
train and test a machine learning model using the model feature data set;
input a feature data set into the machine learning model, the feature data set comprising the model geometry metadata and the simulation metadata, wherein inputting the feature data set into the machine learning model comprises (i) inputting the model geometry metadata into a first machine learning model and (ii) inputting the simulation metadata into a second machine learning model; and
predict, using the machine learning model, a computational cost characteristic for a simulation process, wherein the computational cost characteristic is selected from a group consisting of a memory usage, a time for the simulation process, a time for meshing, a time for preprocessing, a time for solve, and a time for post-processing, and wherein the simulation process is a computer-aided engineering process for simulating a physical human-made object or human-made system represented by computer-aided design.

16. The system of claim 15, wherein the computational cost characteristic is predicted before performing the simulation process.

17. The system of claim 15, wherein the model is a computer-aided design (CAD) model.

18. The system of claim 17, wherein the memory has further computer-executable instructions stored thereon that, when executed by the processor, cause the processor to extract the model geometry metadata from the CAD model.

19. The system of claim 15, wherein the computational cost characteristic is at least one of the memory usage or the time for the simulation process.

20. The system of claim 19, wherein the computational cost characteristic is a time for a portion of the simulation process.

21. The system of claim 19, wherein the memory has further computer-executable instructions stored thereon that, when executed by the processor, cause the processor to estimate a number of core hours based, at least in part, on the time for the simulation process.

22. The system of claim 15, wherein predicting, using the machine learning model, a computational cost characteristic for a simulation process comprises a plurality of computational cost characteristics for the simulation process, each respective computational cost characteristic for the simulation process being based on a different set of compute resources and/or solver options.

23. The system of claim 15, wherein the machine learning model is a deep neural network, a convolutional neural network, gradient boosted decision trees, or Gaussian process regression.

24. The system of claim 15, wherein the feature data set further comprises computing environment metadata, wherein the computing environment metadata is selected from a group consisting of hardware information, a number of processors, and a bandwidth.

25. The system of claim 15, wherein the memory has further computer-executable instructions stored thereon that, when executed by the processor, cause the processor to determine the feature data set.

26. The system of claim 15, wherein the memory has further computer-executable instructions stored thereon that, when executed by the processor, cause the processor to:
perform one or more additional simulations;
supplement the model feature data set with metadata from the one or more additional simulations; and
train and test the machine learning model using the supplemented model feature data set.

27. The system of claim 15, wherein the steps of training and testing the machine learning model are performed iteratively.

28. The system of claim 15, wherein the memory has further computer-executable instructions stored thereon that, when executed by the processor, cause the processor to:
create a fixed-dimensional representation vector from respective outputs of the first and second machine learning models; and
analyze the fixed-dimensional representation vector to predict the computational cost characteristic for the simulation process.

* * * * *